United States Patent
Akulavenkatavara et al.

(10) Patent No.: US 8,386,462 B2
(45) Date of Patent: Feb. 26, 2013

(54) STANDBY INDEX IN PHYSICAL DATA REPLICATION

(75) Inventors: Prasadarao Akulavenkatavara, Portland, OR (US); Aaron I. Henner, Beaverton, OR (US); Gary N. Jin, Portland, OR (US); Steven R. Pearson, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 12/825,264

(22) Filed: Jun. 28, 2010

(65) Prior Publication Data

US 2011/0320404 A1    Dec. 29, 2011

(51) Int. Cl.
*G06F 7/00* (2006.01)

(52) U.S. Cl. ........ 707/711; 707/741; 707/803; 707/804; 707/812

(58) Field of Classification Search .................. None
See application file for complete search history.

(56) References Cited

U.S. PATENT DOCUMENTS

| | | | |
|---|---|---|---|
| 5,404,510 A * | 4/1995 | Smith et al. | 1/1 |
| 5,960,423 A * | 9/1999 | Chaudhuri et al. | 707/715 |
| 2007/0185912 A1* | 8/2007 | Gupta et al. | 707/200 |
| 2008/0005092 A1* | 1/2008 | Kleewein et al. | 707/4 |
| 2008/0162590 A1* | 7/2008 | Kundu et al. | 707/202 |
| 2011/0078135 A1* | 3/2011 | Whitehead et al. | 707/715 |

* cited by examiner

*Primary Examiner* — Debbie Le
*Assistant Examiner* — Anh Tai Tran
(74) *Attorney, Agent, or Firm* — Patterson & Sheridan, LLP

(57) ABSTRACT

Generating a standby index on a standby database server in a physical log-shipping data replication environment. Embodiments of the invention include providing a primary database server and a standby database server, replicating a primary database and a primary database index from the primary database server to the standby database server, generating a standby index on the standby database server, and cataloging the standby index on the standby database server.

18 Claims, 9 Drawing Sheets

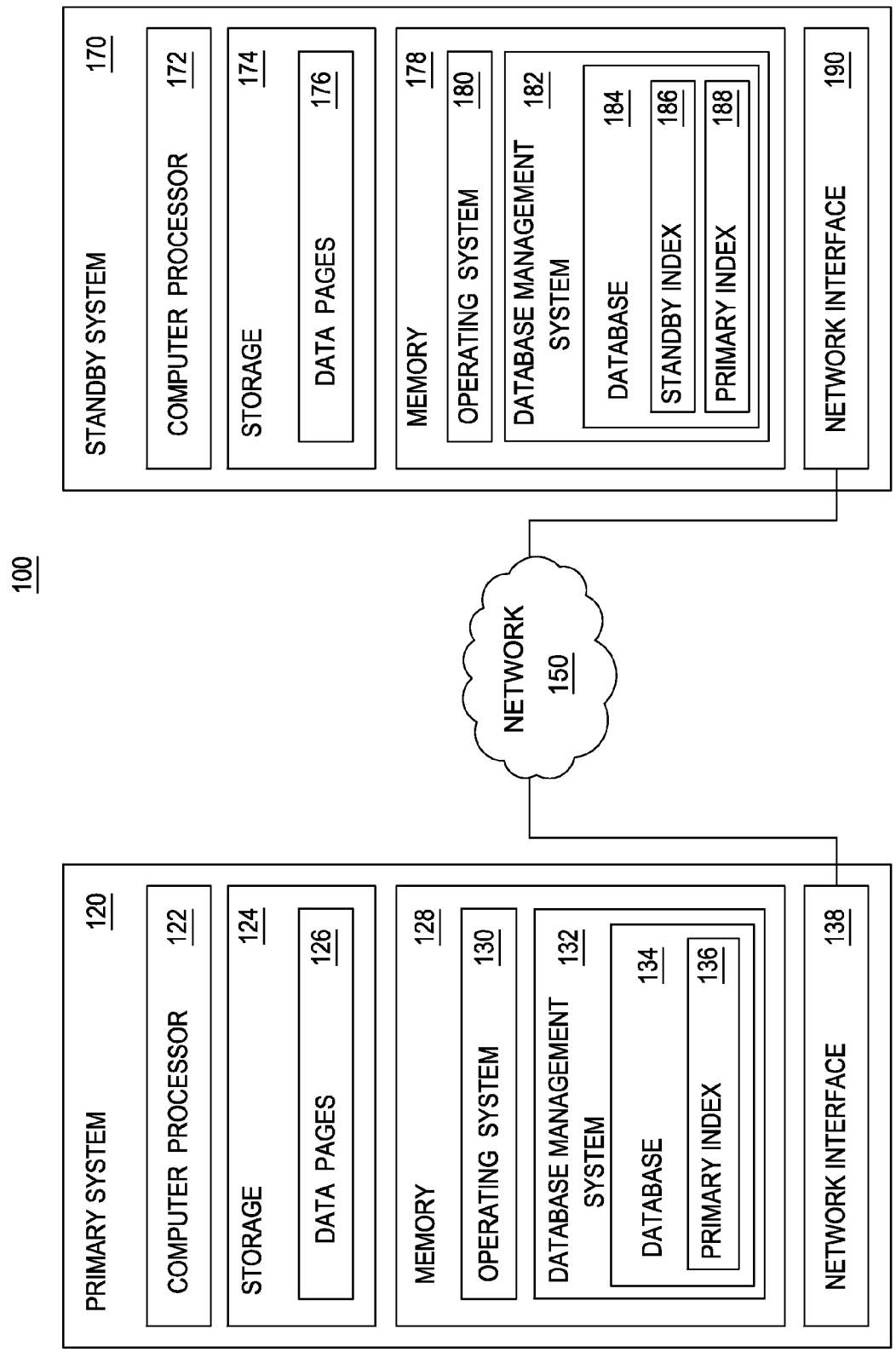

STANDBY INDEX IN PHYSICAL DATA REPLICATION

BACKGROUND

Embodiments of the invention relate to maintaining a database index. And more specifically, embodiments relate to techniques for maintaining a standby index for a standby database.

System architects and engineers often use multiple computer systems in a production environment in order to ensure the stability of business solutions. In such an environment, even if one computer system fails, the solution may fail over to the other computer systems. As an example, for a solution using a database, the environment may contain both a primary database system and a standby database system. In such an environment, the primary database may be replicated to the standby database system, such that if the primary database system fails, the standby database system contains an up-to-date copy of the database and can assume the workload of the primary database. Furthermore, in some environments, the standby database system may be used to perform certain functions similar to the primary database and certain functions completely different from the primary database. The standby database system may be configured to perform these functions even while the primary database system is operational, in order to alleviate some of the workload of the primary database system. As an example, the primary database may be used to manage day-to-day operations of a business, while the standby database may be used to run reports on how the business performs over a period of time.

SUMMARY

Embodiments of the invention provide a computer-implemented method, computer program product, and system for providing a log-shipping physical replication system including (i) a primary database server, including a primary database; and (ii) a standby database server, including a copy of the primary database, wherein the copy of the primary database is replicated from the primary database server. The computer-implemented method, computer program product, and system include generating a standby index by the standby database server, wherein the standby index pertains to operations performed by the standby database server. Additionally, the computer-implemented method, computer program product, and system include accessing the standby index by the standby database server to retrieve results responsive to a query. The computer-implemented method, computer program product, and system further include outputting the retrieved results by operation of one or more computer processors.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 1 is a block diagram of a networked computer system configured to maintain a standby index, according to one embodiment of the invention.

DETAILED DESCRIPTION

Figure 2A:
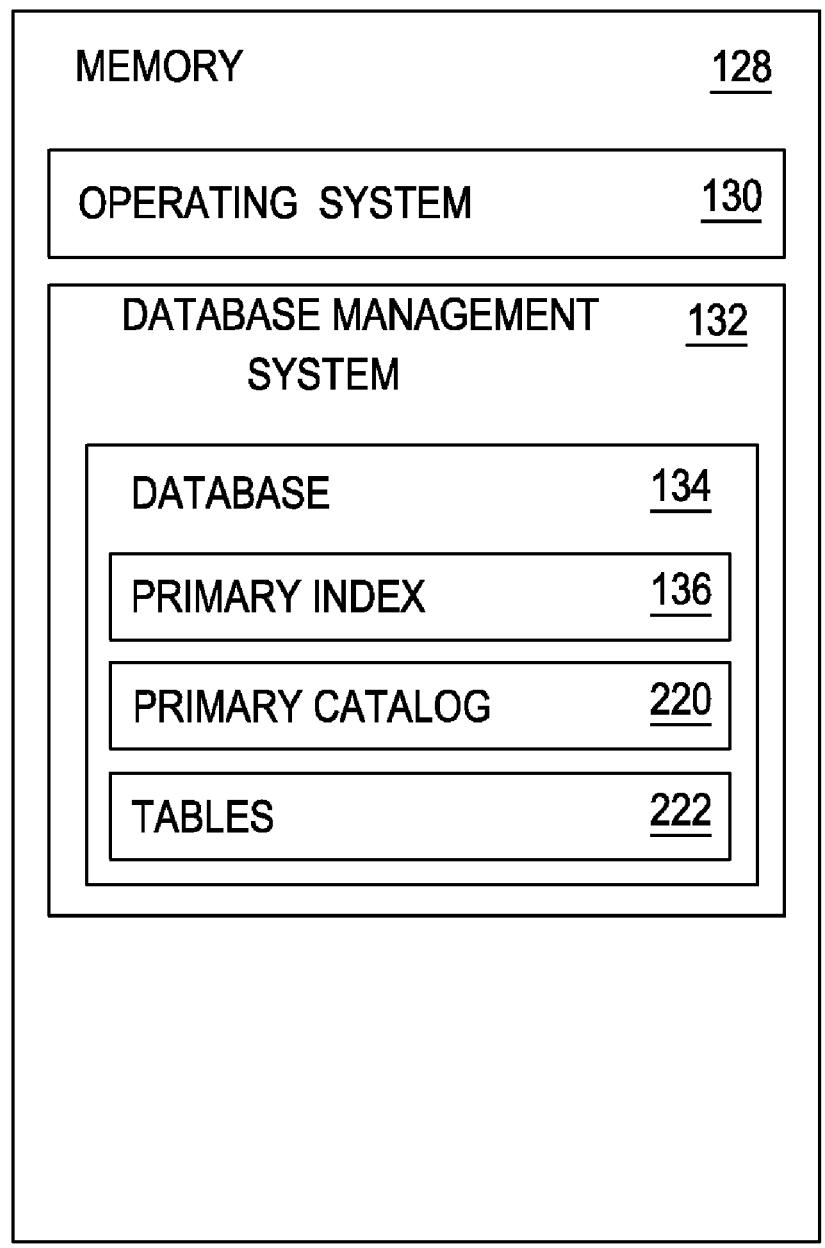
FIGS. 2A-2B are block diagrams of components of the computer systems of FIG. 1, according to one embodiment of the invention.

Computer environments often use redundant computer systems in order to maximize the uptime and stability of computer applications hosted on those systems. For example, an environment may contain both a primary database system and a standby database system. In such an environment, if the primary database system fails, the standby database system may assume the responsibilities and workload of the primary database system. Data from the primary database may be replicated to the standby database system in order to maintain an up-to-date copy of the primary database on the standby system. The replication may be physical replication, where a log of database operations is sent to the standby system, and the database operations contained in the log are subsequently executed by the standby database management system. In any event, by replicating the database to the standby database system, the standby database system maintains an up-to-date copy of the primary database and can assume the role of the primary database at any time.

In some environments, the standby database system may be configured to perform certain functions using the replicated copy of the primary database. For example, a business may configure the primary database system to perform all data modification functionality (e.g., write actions, such as INSERT operations), and may configure the standby database system to perform some or all of the reporting functionality (i.e., read-only actions, such as SELECT operations) for the business solution. As such, a portion of the overall application workload may be offloaded from the primary database system to the standby database system. Thus, the business may take advantage of the processing resources of the standby system, and yet the standby system is still available to assume the role of the primary database system, in the event the primary system fails.

However, in a situation where the primary database and the standby database are performing substantially different tasks (data modification operations versus read-only operations), the two databases may use different indices containing different information. For example, the primary database may use an index that is defined to optimize certain data modification operations, whereas the standby database may use an index that optimizes certain reporting operations. In physical replication techniques, an identical set of indices will exist on each of the primary database and the standby database. In order for reporting-specific indices to be available to the standby database, the primary database is required to perform additional processing and maintain additional index information that the primary database is not using.

In one embodiment of the invention, a primary database may create a primary index and replicate the primary index to the standby database. The standby database server may create a standby index, which is only populated on the standby server. Upon determining that one or more data values in the primary database have changed, the standby database may update the standby index to account for the changes in the database.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but is not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. As defined herein, a computer readable signal medium is any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a block diagram of a networked computer system configured to maintain a standby index, according to one embodiment of the invention. As shown, the system 100 contains a primary system 120 and a standby system 170. The primary system 120 contains a computer processor 122, storage media 124, memory 128 and a network interface 138. Computer processor 122 may be any processor capable of performing the functions described herein. Storage media 124 contains a plurality of data pages 126. The data pages 126 may include one or more rows of data. In one embodiment of the invention, data contained in the data pages 126 is associated with one or more key values in a database. The primary system 120 may connect to the network 150 using the network interface 138. Furthermore, as will be understood by one of ordinary skill in the art, any computer system capable of performing the functions described herein may be used.

In the pictured embodiment, memory 128 contains an operating system 130 and a database management system (hereinafter "DBMS") 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The DBMS 132 contains a primary database 134, which contains a primary index 136. The operating system 130 may be any operating system capable of performing the functions described herein.

The standby system 170 contains a computer processor 172, storage media 174, memory 178 and a network interface 190. Computer processor 172 may be any processor capable of performing the functions described herein. Storage media 174 contains a plurality of data pages 176. The data pages 176 may include one or more rows of data. In one embodiment of the invention, data contained in the data pages 176 is associated with one or more key values in a database. The primary system 170 may connect to the network 150 using the network interface 190. Furthermore, as will be understood by one of ordinary skill in the art, any computer system capable of performing the functions described herein may be used.

In the pictured embodiment, memory 178 contains an operating system 180 and a DBMS 182. Although memory 178 is shown as a single entity, memory 178 may include one or more memory devices having blocks of memory associated with physical addresses, such as random access memory (RAM), read only memory (ROM), flash memory or other types of volatile and/or non-volatile memory. The standby DBMS 182 contains a replicated database 184. The database 184 contains a standby index 186 and a primary index 188. Although the standby index 186 is shown as included in memory 178, the standby index 186 may be stored in any storage location that will not be replicated from the primary DBMS 132 (or otherwise overwritten). The storage location may be physically within the standby system 170, or may be outside the standby system 170 (e.g., on a network storage drive). In one embodiment, the standby index 186 is stored in special database storage spaces that exist only on the standby DBMS 182. As referred to herein, the special database storage space may be any temporary storage space in the standby DBMS 182. For example, in one embodiment, the special database storage space is implemented as a default temporary tablespace in the standby DBMS 182. In another embodiment, the standby index 186 may be maintained on storage media 174. The operating system 180 may be any operating system capable of performing the functions described herein.

Although indices 136, 186 and 188 are shown as single entities, these indices 136, 186 and 188 may each refer to a plurality of physical database indices. As a simple example, primary indices 136 and 188 may contain database indices "A, B, C," while the standby index 186 may contain database indices "D, E." In one embodiment, each index of "A, B, C, D, E" may correspond to a separate database table. In another embodiment, two different indices may refer to the same database table, but use different keys. For example, both index "A" and index "D" may refer to a database table containing columns "FirstName," "LastName," and "Address." However, in this example, database index "A" and database index "D" may be very different from another because, for instance, index "A" may refer to the database table using "FirstName, LastName" as a key, while index "D" may refer to the same database table using "LastName, FirstName, Address" as a key. Exemplary database index structures and keys are discussed in more detail in FIGS. 3 and 4.

In one embodiment, the DBMS system 132 may replicate the database 134 to the standby system 170. As such, the database 134 and the database 184 may contain identical data. The replication may be performed in part using the network 150. The replication may be logical replication or physical replication. In logical database replication, the data values may be replicated from the primary database 134 to the standby database 184. However, using logical replication, the underlying database operations performed by the primary database 134 may not be replicated to the standby database 184.

In contrast, using physical replication (or physical log-shipping replication), the primary DBMS 132 may replicate a log of database operations performed on the primary database 134 to the standby DBMS 182. Upon receiving the log of database operations, the standby DBMS 182 may perform the database operations on the standby database 184. Under physical replication, the data values in the primary database 134 and standby database 184 may be identical. Furthermore, under physical replication, because the identical database operations may be performed on both the primary database 134 and the standby database 184, the underlying database structures of database 134 and 184 may also be the same.

In one embodiment of the invention, the primary DBMS 132 and the secondary DBMS 182 may perform substantially different functions for a business solution or application. For instance, a business may use the primary DBMS 132 to perform all data modification functions for the solution. Thus, in this example, the primary DBMS 132 may be used to process queries that add new data to the database 134, or to modify existing values in the database 134. Continuing with this example, if the primary DBMS 132 processes a query adding a new value to the database 134, the primary DBMS 132 may then replicate that value to the standby DBMS 182 using physical replication. The standby DBMS 182 may then update the standby database 184 by adding the new value to the database 184.

In this example, the standby DBMS 182 may be used for reporting functions. The standby DBMS 182 may be able to perform these read-only functions for the business solution because the standby database 184 is updated through replication. Thus, the standby DBMS 182 may receive and process all or some portion of the queries related to reporting, which may alleviate some of the workload of the primary DBMS 132.

However, in this example, it may be wasteful for the DBMS 132 to maintain an index containing both indices relating to data modification operations and indices relating to read-only operations, because only the standby DBMS 182 is performing reporting functions. As such, the primary index 136 may contain information relating only to operations performed by the primary DBMS 132. The primary DBMS 132 may replicate the primary index 136 to the standby DBMS 182, so that the standby DBMS 182 maintains an updated copy of the primary index 188. Such a copy may be used if, for instance, the primary system 120 fails and the standby system 170 assumes the role and workload of the primary system 120.

However, as shown, the standby DBMS 182 also maintains a standby index 186 that relates to operations performed by the standby DBMS 182. Thus, in the above example, the standby index 186 may contain information relating to reporting functions performed by the standby DBMS 182. Because the standby index 186 is maintained exclusively in the standby DBMS 182, the primary system 120 is not burdened with the additional workload of updating and replicating the index. In one embodiment, the primary DBMS 132 may create the standby index (e.g., in response to a CREATE INDEX statement), and may then replicate the definition of the standby index to the standby DBMS 182. However, in this embodiment, the standby DBMS 182 may still be tasked with populating and maintaining the standby index 186, while the primary DBMS 132 will simply contain an unpopulated definition of the standby index.

Figure 2B:
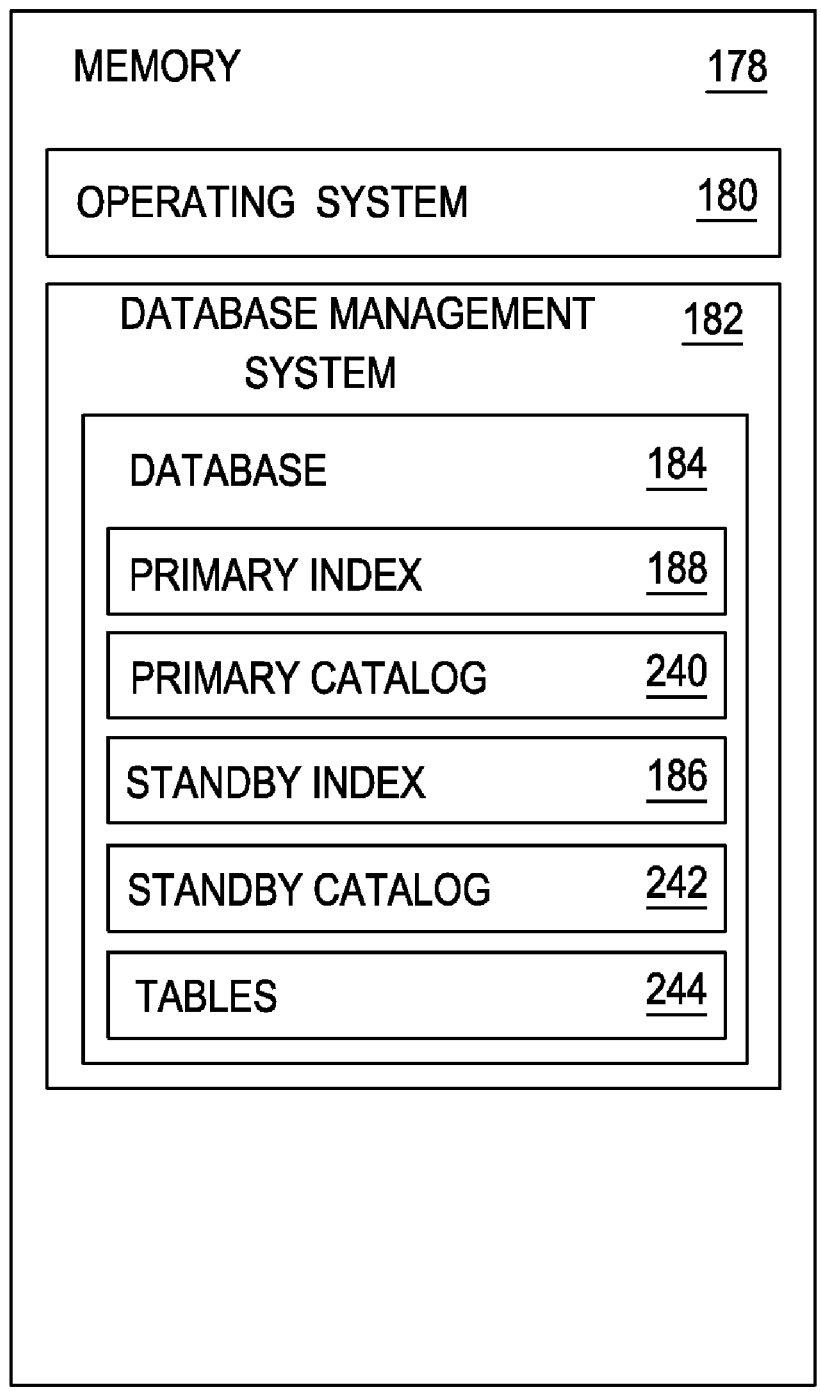

FIGS. 2A-2B are block diagrams of components of the computer systems of FIG. 1, according to one embodiment of the invention. FIG. 2A shows an exemplary embodiment of the memory 128 of the primary system 120. As shown, the memory 128 contains an operation system 130 and a primary DBMS 132. The primary DBMS 132 contains a primary database 134. The database 134 contains a primary index 136, a primary catalog 220, and tables 222. The primary catalog 220 may contain metadata about the primary database 134, including base tables, views, synonyms, value ranges, users, and user groups. The primary catalog 220 may also contain metadata about the primary index 136 for the primary database 134. Such information may include metadata on the clustering of the data pages 126, what tables are used in the primary index 136, what keys are used in the primary index 136, etc. The primary DBMS 132 may update the primary catalog 220 as the database 134 and primary index 136 change.

FIG. 2B shows an exemplary embodiment of the memory 178 of the standby system 170. As shown, the memory 178 contains an operating system 180 and a standby DBMS 182. The standby DBMS 182 includes a replicated database 184. The database 184 contains a primary index 188, a primary catalog 240, a standby index 186, a standby catalog 242 and tables 244. As discussed above, the database 184, primary index 188 and primary catalog 240 may be replicated from the primary DBMS 132 to the standby DBMS 182, using physical replication techniques. Furthermore, in one embodiment, the primary catalog 240 and the standby catalog 242 may be implemented as a single catalog.

The standby DBMS 182 also includes a standby index 186. The standby index 186 is generally an index created based on operations performed by the standby DBMS 182. For example, in an embodiment where the standby DBMS 182 performs all the reporting functionality for a business solution, the standby index 186 may contain keys and corresponding row IDs related to reporting functionality. The standby index 186 may contain different keys or pertain to different tables in the database 184 than the primary index 188. Additionally, the standby index 186 may be populated and maintained by the standby DBMS 182. Thus, when the primary DBMS 132 replicates a change in the database 134 to the standby DBMS 182, the standby DBMS 182 may perform the change and may also update the standby index 186 based on the change.

As shown, the standby DBMS 182 also contains a standby catalog 242. The standby catalog 242 may contain metadata about the standby database 184, including base tables, views, synonyms, value ranges, users, and user groups. The standby catalog 242 may also contain metadata about the standby index 186 for the standby database 184. Such information may include metadata on the clustering of the data pages 126, what tables are used in the standby index 186, what keys are used in the standby index 186, etc. The standby DBMS 182 may update the standby catalog 242 as the database 184 and standby index 186 change. In one embodiment, the standby catalog 242 and the primary catalog 240 are implemented as a single catalog. In this embodiment, the standby catalog 242 refers to the metadata in the single catalog related to the standby index 186.

Generally, the standby index 186 is populated only on the standby server 170. As a result, the standby server 170 is able to reduce the workload of the primary server 120 by assuming responsibility for certain operations of the business solution (e.g., handling all reporting functions). Additionally, the standby server 170 may further reduce the workload of the primary server 120, because the standby DBMS 182 exclusively maintains the standby index 186. In current physical replication systems where the standby DBMS 182 may be responsible for certain aspects of a business solution, such as reporting functionality, the primary DBMS 132 is still required to maintain all indices, including those that maintain information relating to both data modification functions and read-only functions. However, embodiments of the invention enable the standby DBMS 182 to maintain an index 186, separate from the primary index 136 and the replicated primary index 188, which pertains only to operations performed on the standby system 170. As a result, the primary DBMS 132 may maintain a primary index 136 that relates only to the functions performed by the primary DBMS 132, thus resulting in a reduced workload for the primary system 120.

Figure 3:
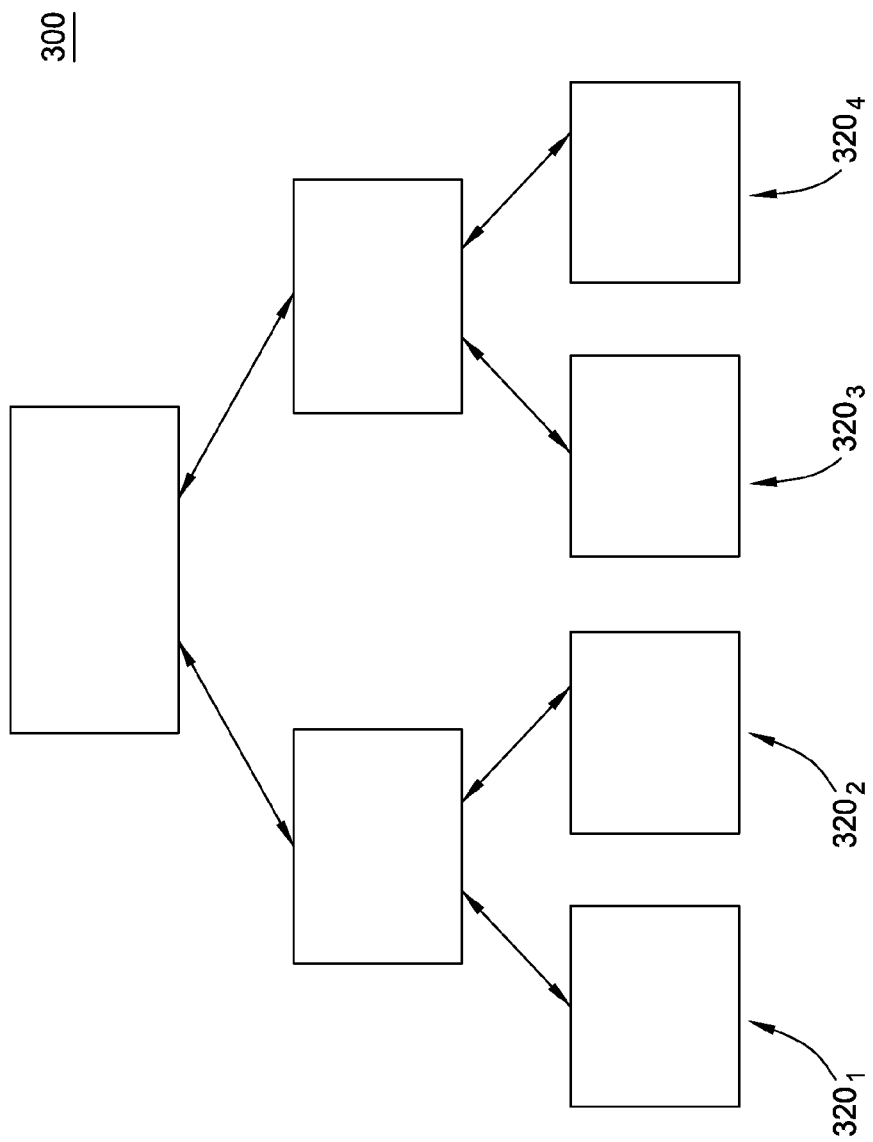
FIG. 3 is an exemplary tree structure for indexing a database table, according to one embodiment of the invention.

FIG. 3 is an exemplary tree structure for indexing a database table, according to one embodiment of the invention. As shown, the tree 300 contains various nodes, including leaf nodes 320. In one embodiment, a DBMS may use the tree 300 to index a plurality of database keys contained in a database table. That is, the tree 300 may include information about each key in the database table and, for each key, may also contain one or more location values. For example, in one embodiment, the primary DBMS 132 may use the primary index 136, defined as a tree structure 300, to index one or more tables in the database 134. In one embodiment, the location values are represented by a row identifier (or "RID") that specifies a row on a particular data page 126 or 176 where the value is stored. The tree 300 may contain a location value for each instance of the key in the database table.

Figure 4:
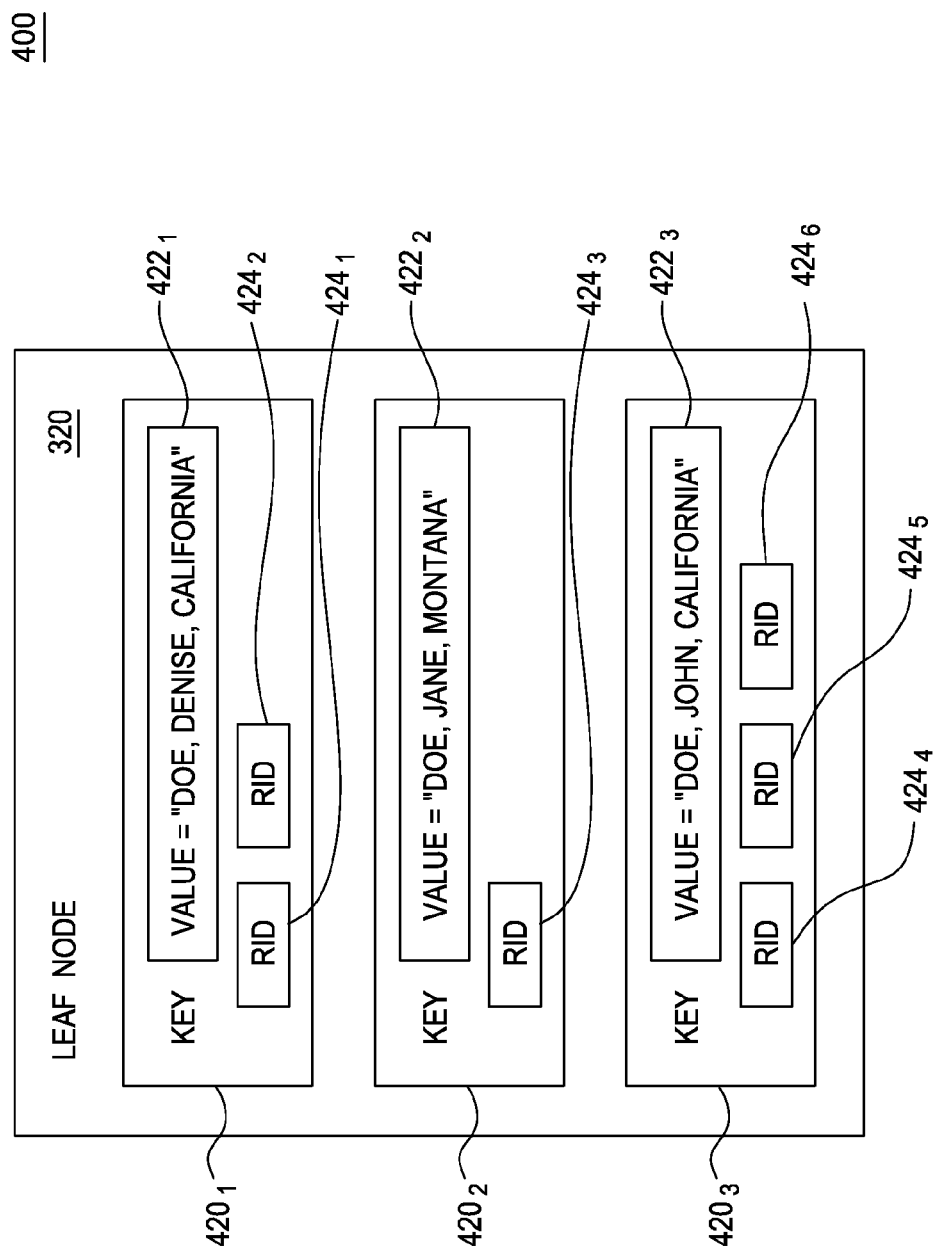
FIG. 4 is a diagram of a leaf node of the tree structure of FIG. 3, according to one embodiment of the invention.

FIG. 4 is a diagram of a leaf node of the tree structure of FIG. 3, according to one embodiment of the invention. In this example, FIG. 4 shows a leaf node 320 of a tree 300 indexing a database table storing phonebook data. More specifically, the database table contains columns "FirstName", "LastName", "State" and "Phone Number". Furthermore, values in the database table (such as the Phone Number value) may be accessed using a key containing "LastName, FirstName, State". As an example, the pictured leaf node 320 contains three database keys 420. Each key 420 contains a key value 422, and one or more row identifiers 424. As noted above, each row identifier 424 contains a location (e.g., a data page and a row on the data page) where a data value for the key is stored. For example, key $420_1$ contains a key value $422_1$ of "Doe, Denise, California" and row identifiers $424_1$ and $424_2$. In other words, the database table contains data for two people named Denise Doe who live in California. As an additional example, the leaf node 320 also contains key $420_2$, with value $422_2$ of "Doe, Jane, Montana" and a single row identifier $424_3$. Thus, the database table represented by the tree structure 300 in this example only contains data for one person named Jane Doe who lives in Montana. Although the pictured leaf node 320 only contains three key values 420, different sizes of leaf nodes may of course be used.

In one embodiment, the primary index 136 and the replicated primary index 188 are structurally similar to the standby index 186. That is, all three indices 136, 186 and 188 may use, for example, the tree structure 300 shown in FIG. 3 to index data in the corresponding databases 134 and 184. Furthermore, the information contained in the primary index 136 and the replicated primary index 188 may be identical, because the index 188 is replicated from primary index 136. However, although the standby index 186 may share the same structure as indices 136 and 188, the standby index 186 may contain different data than either of the other indices. For example, in an embodiment where the primary DBMS 132 is used for data modification operations and the standby DBMS 182 is used for reporting operations, the primary index 136 may contain substantially different data than the standby index 186, as the two indices are used for substantially different purposes. Continuing the example, while the standby index 186 may use the key of "LastName, FirstName, State" (as shown in FIG. 4), the primary index 136 may use a key of only "LastName, FirstName."

The indices 136 and 186 may also differ in other ways, such as referring to one or multiple different tables. As discussed above, indices 136, 186 and 188 may represent multiple physical database indices, each of which may relate to different database tables. For example, while the standby index 186 may relate to a database table containing phonebook information, the primary index 136 may represent two indices each relating to a different database table: one to a database table containing billing information, and another to a database table containing service information. In one embodiment, a physical database index may relate to multiple database tables. As such, two indices may differ because a first index relates to tables "A and B," while the second index relates to tables "A and C." Thus, although the indices 136 and 186 may be similar structurally, the information contained in the indices 136 and 186 may be partially or entirely different.

Figure 5:
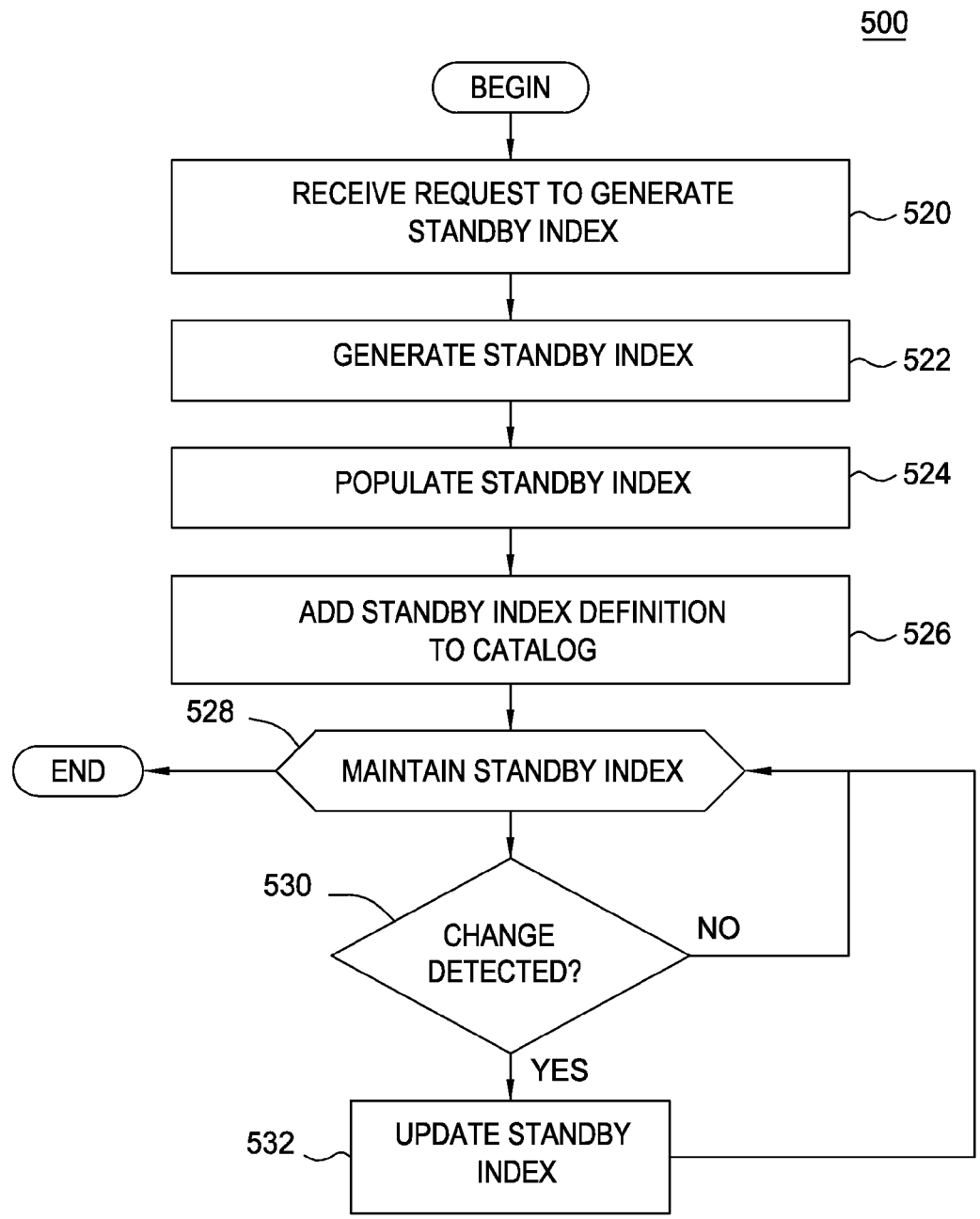
FIG. 5 is a flow diagram illustrating a method of generating a standby index, according to one embodiment of the invention.

FIG. 5 is a flow diagram illustrating a method of generating a standby index, according to one embodiment of the invention. As shown, the method 500 begins at step 520, where the standby DBMS 132 receives a request to generate a standby index 186 (step 520). In one embodiment, the request may be received directly from a user (e.g., a database administrator). In another embodiment, the primary DBMS 132 may receive an initial request from the user and generate a definition for the standby index on the primary system 120. However, in this embodiment, the primary DBMS 132 will not populate its instance of the standby index, but rather will replicate the definition of the standby index (using physical replication techniques) to the standby DBMS 182. Once the request is received, the standby DBMS 182 generates the definition for the standby index 186 (step 522). In an alternate embodiment where the request is replicated from the primary DBMS 132, the standby DBMS 182 may define the standby index 186 upon receiving the replicated definition.

Once the standby index 186 is defined, the standby DBMS 182 then populates the standby index 186 with data (step 524). Generally, the standby index 186 is populated with data associated with the functionality of the standby DBMS 182. For example, if the standby DBMS 182 is responsible for handling the reporting functionality of a business solution, the standby index 186 may be populated with data associated with the reporting functionality. In one embodiment, the standby index may be populated the first time a query attempts to make use of the index (i.e., on the first access of the index). In another embodiment, the standby index may be built immediately after the definition is replicated. In this embodiment, the standby index may be populated either in-line with the replay of the catalog operations, or may be populated asynchronously in the background. In one embodiment, the index 186 may store the data using a tree structure, such as the exemplary tree structure 300 shown in FIG. 3. Such a structure 300 may include multiple leaf nodes 320, each containing one or more key values 422 and corresponding RIDs 424. Of course, other data models may be used to represent the data in the standby index 186.

Once the standby index 186 is populated, the standby DBMS 182 adds the standby index definition to the standby catalog 242 (step 526). In an embodiment where the standby catalog 242 and primary catalog 240 are implemented as a single catalog, the primary DBMS 132 may add the standby index definition to the single catalog. In this embodiment, the primary DBMS 132 adds the standby index definition to the single catalog, which is then replicated to the standby DBMS 182. As discussed above, the standby catalog 242 may contain metadata about information contained in the replicated database 184. Additionally, the standby catalog 242 may contain metadata about the standby index 186.

Once the standby catalog 242 is generated, the method 500 begins a loop, wherein the standby index 186 is maintained (step 528). The standby DBMS 182 may monitor the replicated database 184 (step 530), and if a change is detected in the database 184, the DBMS 182 updates the standby index 186 (step 532) based on the change. In one embodiment, the standby DBMS 182 may maintain the standby index 186 as the standby DBMS 182 replays the logs of operations replicated from the primary DBMS 132. In such an embodiment, when the standby DBMS 182 determines that an operation updates data related to the standby index 186, the DBMS 182 may update the index 186 accordingly. When the standby index 186 no longer needs to be maintained, the method ends. Examples of when the standby index 186 would no longer need to be maintained include when the standby DBMS 182 shuts down (e.g., in response to a shutdown command received from a user), when the primary DBMS 132 fails and the standby DBMS 182 assumes the role of the primary DBMS 132, and when the index is no longer needed for the workload and accordingly is dropped. In an alternate embodiment, where the standby index 186 is not maintained in memory 178 (e.g., where the standby index 186 is maintained on storage 174), the standby DBMS 182 may simply stop using the standby index 186 when it is no longer needed (e.g., when the standby DBMS 182 shuts down). In this alternate embodiment, the standby DBMS 182 may then resume using the standby index 186 once it is needed again (e.g., when the standby DBMS 182 is restarted).

One advantage of the method 500 is that the primary DBMS 132 does not have to populate and maintain the standby index 186. Instead, this work is performed by the standby DBMS 182 on the standby system 170. As a result, the primary system 120 may avoid using its resources (e.g., computer processor 122, storage 124 and memory 128) to create and maintain index information that the primary system 120 does not use. In other words, because the standby index 186 contains index information used only by the standby DBMS 182, the primary system 120 gains no benefits from generating and maintaining the standby index 186. By shifting this processing to the standby system 170, the primary system 120 may conserve its resources for other processing operations. Another advantage of the method 500 is that queries on the standby system 170 may run faster, as the standby index 186 contains indexes pertaining to the workload of the standby DBMS 182.

Figure 6A:
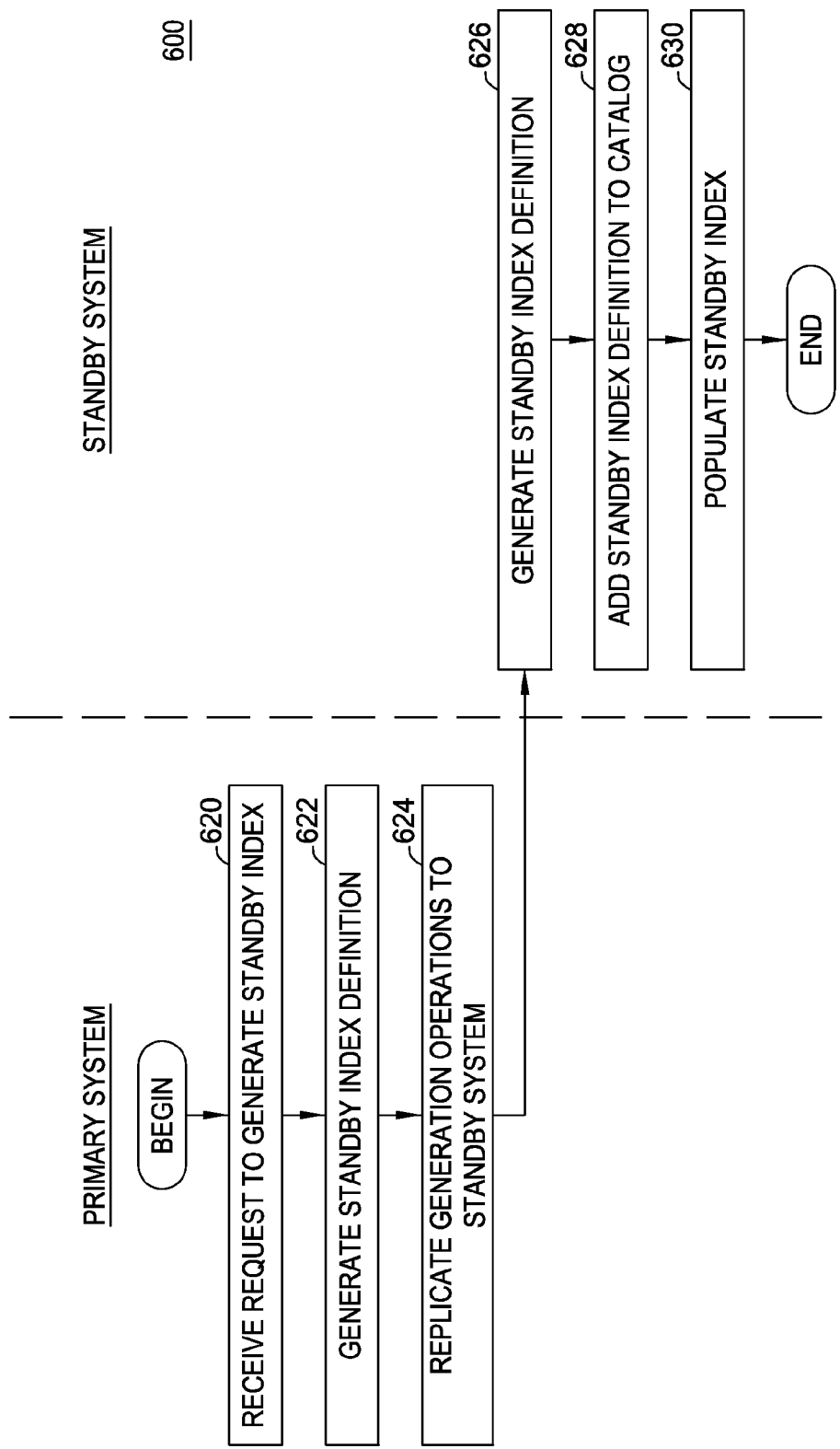
FIGS. 6A-6B are flow diagrams illustrating a method of generating and maintaining a standby index, according to one embodiment of the invention.
Figure 6B:
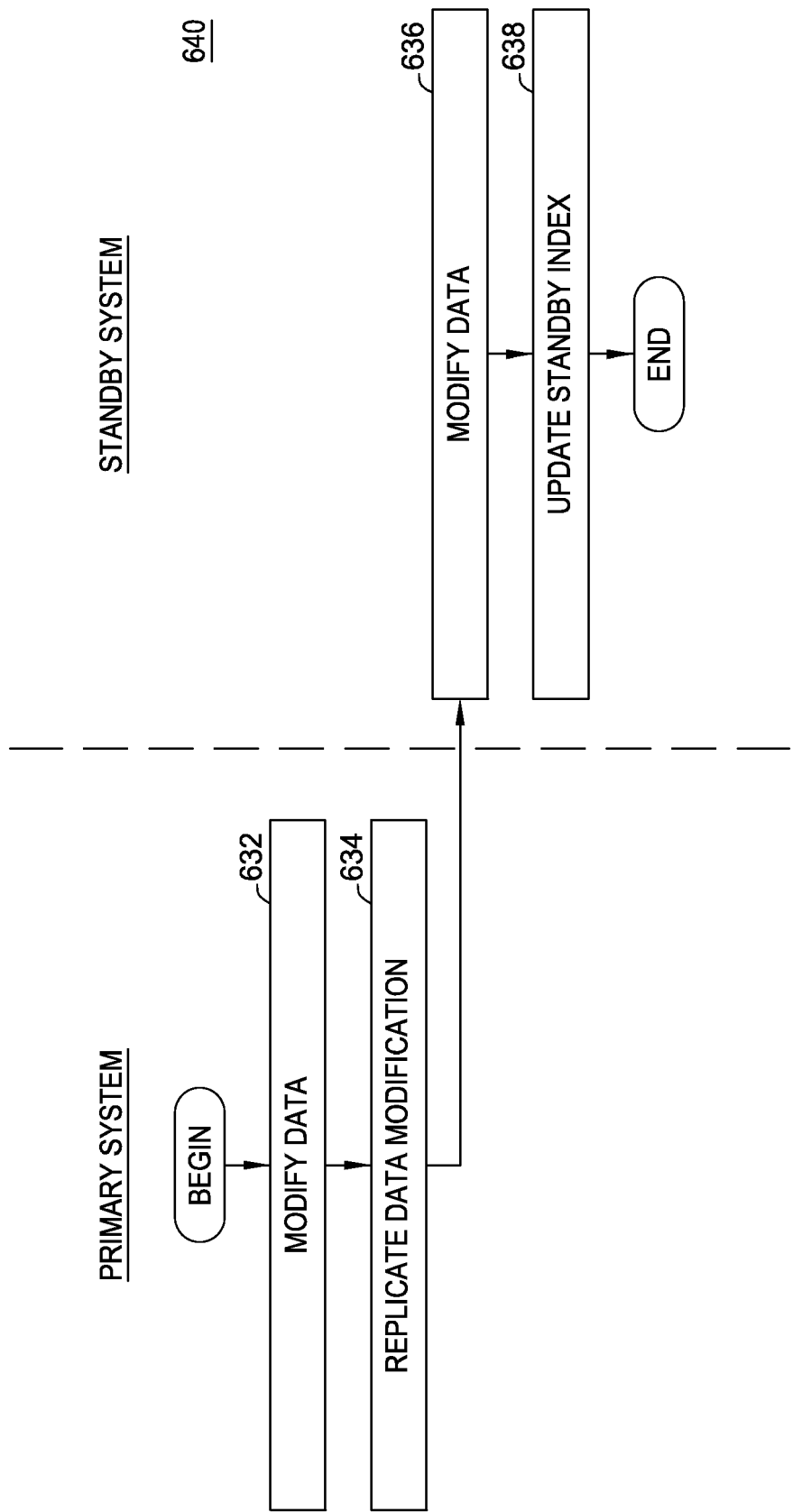

FIGS. 6A-6B are flow diagrams illustrating a method of generating and maintaining a standby index, according to one embodiment of the invention. More particularly, FIG. 6A is a flow diagram illustrating a method of generating a standby index, according to one embodiment of the invention. As shown, the method 600 begins at step 620, where the primary system 120 receives a request to generate a standby index. Upon receiving the request, the primary DBMS 132 generates a standby index definition (step 622). The standby index definition is then replicated to the standby system (step 624). Furthermore, the primary DBMS 132 may update the standby index definition. The updates to the standby index definition may then be subsequently replicated to the standby DBMS 182. Although the primary system 120 receives the request and generates the definition for the standby index, the primary DBMS 132 does not populate the standby index definition with data. Rather, in this embodiment, the primary DBMS 132 only defines the standby index, such that the standby index definition may be replicated to the standby system 170.

Upon receiving the replicated standby index definition, the standby DBMS 182 generates the standby index 186 (step 626). As discussed above, the replication may be performed using physical replication. Once the standby index 186 is generated, the standby DBMS 182 adds the standby index definition to the standby catalog 242 (step 628). In one embodiment, where the standby catalog 242 and the replicated primary catalog 240 are implemented as a single catalog, the standby DBMS 182 may insert an entry representing the standby index definition into the single catalog. Furthermore, in a second embodiment using a single catalog, the primary DBMS 132 may insert a entry representing the standby index definition into the single catalog, and may then replicate this catalog to the standby DBMS 182. As discussed above, the standby catalog 242 may contain metadata describing the standby index 186, as well as metadata describing the database 184.

The standby DBMS 182 then populates the standby index 186 with data (step 630). As discussed above, the data in the standby index 186 may be stored using the exemplary tree structure 300, as shown in FIGS. 3 and 4. Once the standby index 186 and standby catalog 242 have been generated and populated, the standby DBMS 182 may use the standby index 186 and standby catalog 242 in performing database operations. For example, in an embodiment of the invention where the standby DBMS 182 is used for reporting functions, the standby DBMS 182 may use the standby index 186, for instance, to look up values specified by a SELECT statement.

FIG. 6B is a flow diagram illustrating a method of maintaining a standby index, according to one embodiment of the invention. As shown, the method 640 begins at step 632, where the primary DBMS 132 modifies one or more data values in the database 134. In one embodiment, upon making the modification to the database 134, the primary DBMS 132 may additionally update the primary index 136, based on the changes to the database 134. In such an embodiment, the updated primary index 136 may also be replicated to the standby system 170, such that the standby DBMS 182 may update primary index 188 accordingly. Furthermore, in one embodiment, the primary DBMS 132 may update the standby index definition, and this modification may subsequently be replicated to the standby system 170. However, even in this embodiment, the primary DBMS 132 does not populate the standby index definition. Rather, this task may be reserved for the standby DBMS 182.

The modification is then replicated to the standby system 170 (step 634). Upon receiving the replicated modification, the standby DBMS 182 modifies the data in the database 184, based on the replicated modification (step 636). As an example, in an environment using physical replication, the primary DBMS 132 may replicate the one or more database operations used to modify the data to the standby system 170, whereupon the standby DBMS 182 may execute the one or more data operations against the database 184. Once the database 184 is updated, the standby DBMS 182 updates the standby index 186 to account for the modification to the database 184 (step 638). Once the standby index 186 is updated, the method 640 ends.

In this embodiment, although the primary DBMS 132 generates an initial definition for the standby index, the primary DBMS 132 is not tasked with populating the standby index. Furthermore, even when the primary DBMS 132 modifies data in the database 134, the primary DBMS 132 does not update the standby index. Rather, in both cases, the events are replicated to the standby system 170, where the standby DBMS 182 populates or updates the standby index 186. As such, the primary system 120 is not taxed with maintaining a standby index, which is used solely by the standby system 170.

Figure 7:
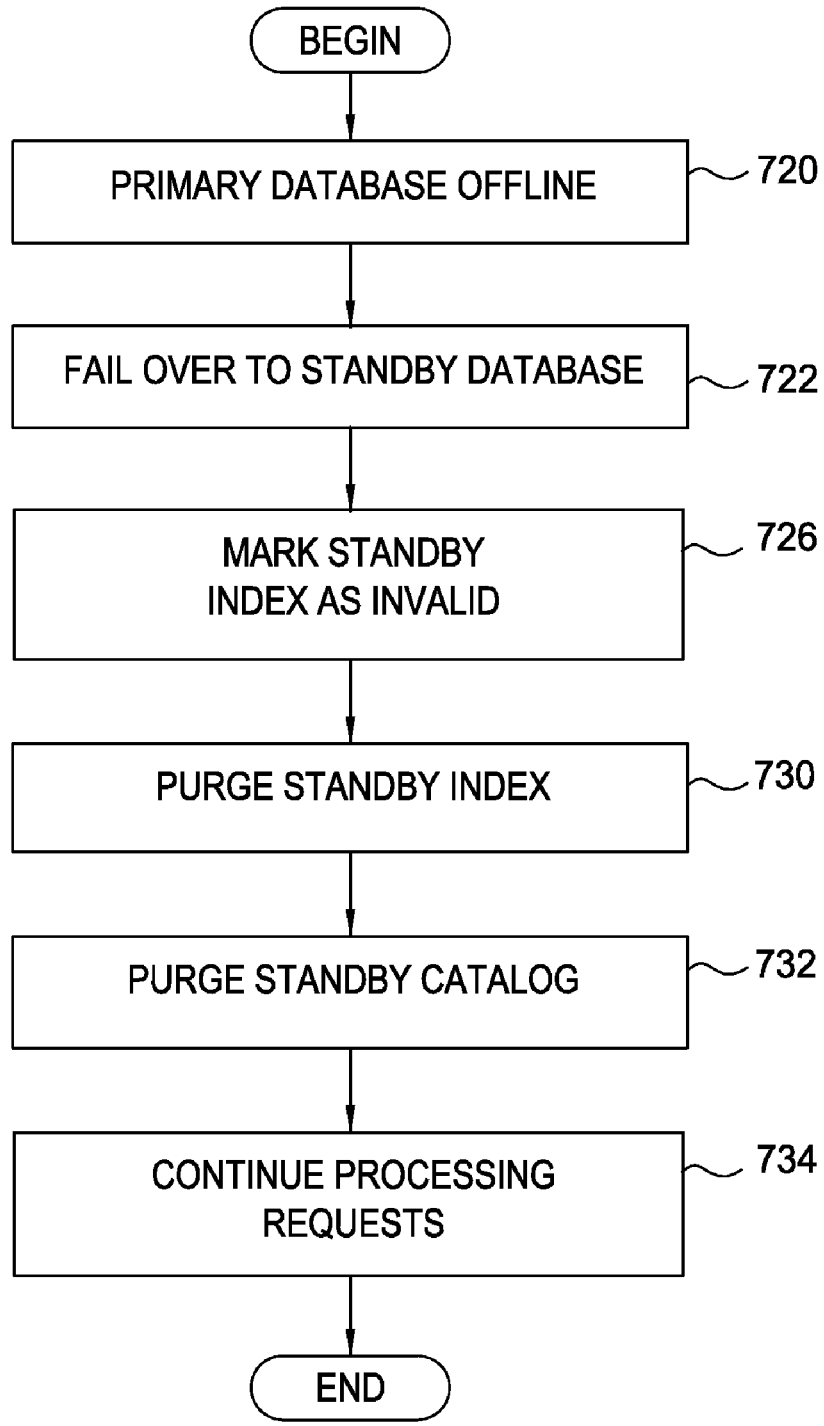
FIG. 7 is a flow diagram illustrating a method of failing over to a standby database containing a standby index, according to one embodiment of the invention.

FIG. 7 is a flow diagram illustrating a method of failing over to a standby database containing a standby index, according to one embodiment of the invention. In this example, the primary system 120 is responsible for data modification operations, while the standby system 170 is responsible for reporting operations. As shown, the method 700 begins at step 720, where the primary database goes offline. This may occur because of a variety of reasons including natural disaster or man-made disaster. Additionally, the primary DBMS 132 may be taken offline intentionally as part of a disaster recovery exercise. In any event, once the primary database is unavailable, the solution fails over to the standby database 184 and the standby DBMS 182 assumes the role previously held by the primary DBMS 132 (step 722). For instance, because the primary DBMS 132 in this example is responsible for data modification operations, if the primary DBMS 132 goes offline, the solution may fail over to the standby system 170, whereupon the standby DBMS 182 will then become responsible for data modification operations.

Once the solution fails over to the standby system 170, the standby DBMS 182 marks the standby index 186 as invalid (step 726). By marking the standby index 186 as invalid, the standby DBMS 182 indicates that the index 186 should be purged. As shown, the standby DBMS 182 then purges the previous standby index 186 (step 730). Likewise, the standby DBMS 182 then purges the standby catalog 242 (step 732). In an embodiment where the standby catalog 242 and primary catalog 242 are implemented as a single catalog, the standby DBMS 182 purges only the entries relating to the standby index 186 from the single catalog. Once the catalog 242 is purged, the standby DBMS 182 continues processing requests (step 734). In one embodiment, the purging of the standby index 186 and standby catalog 242 is performed immediately upon the standby DBMS 182 assuming the role of the primary DBMS 132. In another embodiment, the purging occurs in the background, during periods where the processing resources of the standby system are underutilized or idle 170.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method for processing queries in a log-shipping physical replication system comprising (i) a primary database server, comprising a primary database; and (ii) a standby database server, comprising a copy of the primary database, wherein the copy of the primary database is replicated from the primary database server, comprising:
   responsive to a request to generate an index definition for a standby index, generating the index definition for the standby index, by the primary database server;
   replicating the index definition for the standby index from the primary database server to the standby database server;
   while the primary database server is actively replicating data to the standby database server, generating the standby index by populating the replicated index definition, by the standby database server, wherein the standby index pertains to operations performed by the standby database server and wherein the standby index is distinct from any indices on the standby database server replicated from the primary database server and pertaining to the primary database;
   accessing the standby index by the standby database server to retrieve results responsive to a query; and
   outputting the retrieved results by operation of one or more computer processors.

2. The method of claim 1, further comprising:
   upon determining that the primary database server has failed:
   modifying the standby database server to assume the role of the primary database server; and
   purging the standby index.

3. The method of claim 2, wherein purging the standby index further comprises purging all indices marked as invalid, and further comprising:
   marking the standby index as invalid.

4. The method of claim 1, wherein populating the standby index occurs at a time of first access of the standby index.

5. The method of claim 1, further comprising: updating the standby index based on the modification to the one or more data values, by the standby database server.

6. The method of claim 1, further comprising:
   modifying one or more data values in the primary database, by the primary database server;
   replicating the modification of the one or more data values to the standby database server, by the primary database server.

7. A computer program product for providing a standby index in a log-shipping physical replication system, wherein the log-shipping physical replication system comprises (i) a primary database server, comprising a primary database, and (ii) a standby database server, comprising a copy of the primary database, wherein the copy of the primary database is replicated from the primary database server, the computer program product comprising:
   a non-transitory computer-readable storage medium having computer readable program code embodied therewith, the computer readable program code comprising:
   computer readable program code to, responsive to a request to generate an index definition for a standby index, generate the index definition for the standby index, by the primary database server;
   computer readable program code to replicate the index definition for the standby index from the primary database server to the standby database server;
   computer readable program code configured to generate, while the primary database server is actively replicating data to the standby database server, the standby index by populating the replicated index definition, by the standby database server, wherein the standby index pertains to operations performed by the standby database server and wherein the standby index is distinct from any indices on the standby database server replicated from the primary database server and pertaining to the primary database;
   computer readable program code configured to access the standby index, by the standby database server, to retrieve results responsive to a query; and
   computer readable program code configured to output the retrieved results by operation of one or more computer processors.

8. The computer program product of claim 7, further comprising:
   computer readable program code configured to monitor for primary database server failure, and upon determining the primary database server has failed:
   computer readable program code configured to modify the standby database server to assume the role of the primary database server; and
   computer readable program code configured to purge the standby index.

9. The computer program product of claim 8, wherein the computer readable program code configured to purge the standby index further comprises computer readable program code configured to purge all indices marked as invalid, and further comprising:
   computer readable program code configured to mark the standby index as invalid.

10. The computer program product of claim 7, wherein the computer readable program code configured to populate the standby index occurs at a time of first access of the standby index.

11. The computer program product of claim 7, further comprising: computer readable program code configured to update the standby index based on the modification to the one or more data values, by the standby database server.

12. The computer program product of claim 7, further comprising:
    computer readable program code configured to modify one or more data values in the primary database, by the primary database server; and
    computer readable program code configured to replicate the modification of the one or more data values to the standby database server, by the primary database server.

13. A system, comprising:
    a computer processor and a memory;
    a primary database server, comprising a primary database, configured to:
    responsive to a request to generate an index definition for a standby index, generating the index definition for the standby index, by the primary database server;

replicating the index definition for the standby index from the primary database server to the standby database server; and a standby database server, comprising:

a copy of the primary database, wherein the copy of the primary database is replicated from the primary database server, wherein the standby database server is configured to:

while the primary database server is actively replicating data to the standby database server, generate the standby index by populating the replicated index definition wherein the standby index pertains to operations performed by the standby database server and wherein the standby index is distinct from any indices on the standby database server replicated from the primary database server and pertaining to the primary database;

access the standby index to retrieve results responsive to a query; and output the retrieved results.

14. The system of claim 13, wherein the standby database server is further configured to:

upon determining that the primary database server has failed:

modify the standby database server to assume the role of the primary database server; and purge the standby index.

15. The system of claim 14, wherein the standby database server is configured to purge the standby index by purging all indices marked as invalid, and wherein the standby database server is further configured to mark the standby index as invalid.

16. The system of claim 13, wherein the standby database server is configured to populate the standby index at a time of first access of the standby index.

17. The system of claim 13, the operation further comprising: updating the standby index based on the modification to the one or more data values, by the standby database server.

18. The system of claim 13, wherein the primary database server is configured to:

modify one or more data values in the primary database; and replicate the modification of the one or more data values to the standby database server.

* * * * *